(12) United States Patent
Hashash

(10) Patent No.: US 7,380,291 B2
(45) Date of Patent: Jun. 3, 2008

(54) AIRBAG EQUIPPED GARMENT AND DEPLOYMENT SYSTEM

(76) Inventor: Ahmad Al Hashash, Block 1, Street 39, House 2, Al-Rabia (KW)

(*) Notice: Subject to any disclaimer, the term of this patent is extended or adjusted under 35 U.S.C. 154(b) by 44 days.

(21) Appl. No.: 11/402,968

(22) Filed: Apr. 13, 2006

(65) Prior Publication Data

US 2006/0242746 A1    Nov. 2, 2006

Related U.S. Application Data

(60) Provisional application No. 60/671,097, filed on Apr. 14, 2005.

(51) Int. Cl.
*A41D 1/04* (2006.01)

(52) U.S. Cl. .................................. 2/456; 2/DIG. 3

(58) Field of Classification Search .............. 2/102, 2/455, 456, 463, 464, 465, 467, 411, 413, 2/462, DIG. 3; 411/88, 90, 92–94, 96
See application file for complete search history.

(56) References Cited

U.S. PATENT DOCUMENTS

| | | | | |
|---|---|---|---|---|
| 4,059,852 A | * | 11/1977 | Crane ............................. 2/456 |
| 4,161,797 A | * | 7/1979 | Ruscigno ..................... 441/94 |
| 4,825,469 A | * | 5/1989 | Kincheloe ..................... 2/456 |
| 5,746,442 A | * | 5/1998 | Hoyaukin ................ 280/730.1 |
| 6,125,478 A | * | 10/2000 | Alaloof ......................... 2/456 |
| 6,422,420 B1 | * | 7/2002 | Brown .......................... 222/5 |
| 6,766,535 B2 | * | 7/2004 | Duhamell et al. ............. 2/102 |
| 6,951,493 B1 | * | 10/2005 | Lu ............................. 441/93 |

* cited by examiner

*Primary Examiner*—Tejash Patel
(74) *Attorney, Agent, or Firm*—Lowe Hauptman Ham & Berner, LLP

(57) ABSTRACT

An airbag equipped garment and deployment system for a motorcycle rider includes an inflatable garment shaped member for encompassing an upper body of a motorcycle rider and a mass of compressed gas. The system includes a first sensor for detecting the separation of the rider from the motorcycle and a second sensor for detecting the tilt of the cycle and deploying the gas when the rider separates from the motorcycle or the tilt exceeds a pre-selected value. A separate sensor senses a collision for deployment of gas in the event of a collision while a separate sensor deactivates the system until the speed of the motorcycle has reached a predetermined speed.

4 Claims, 3 Drawing Sheets

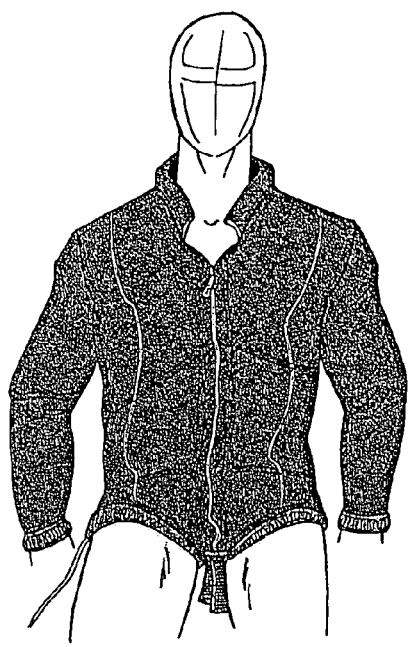
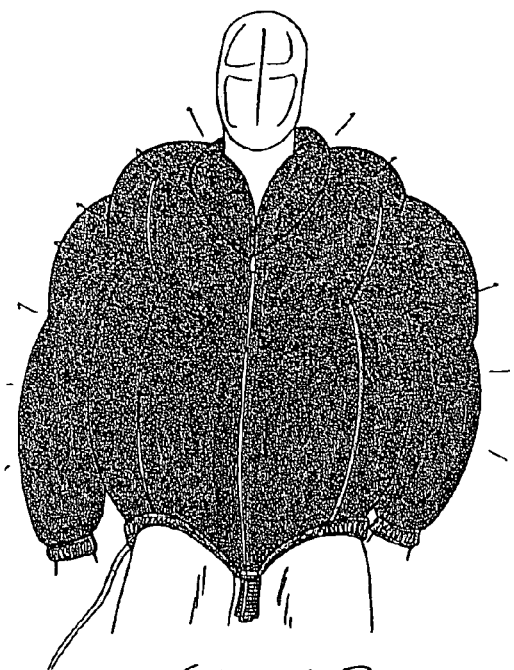
Figure 1. Front view
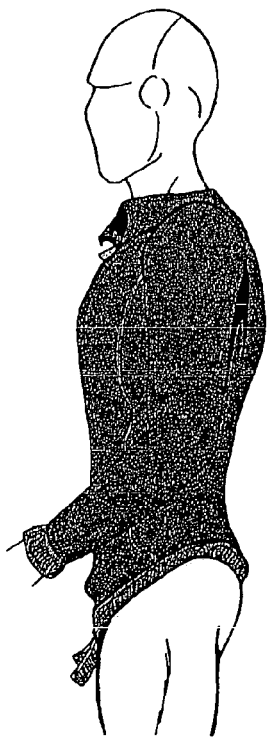
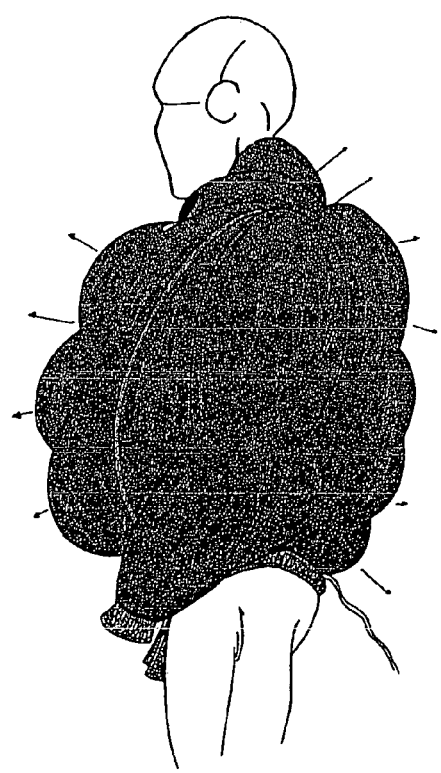
Figure 2. Side view

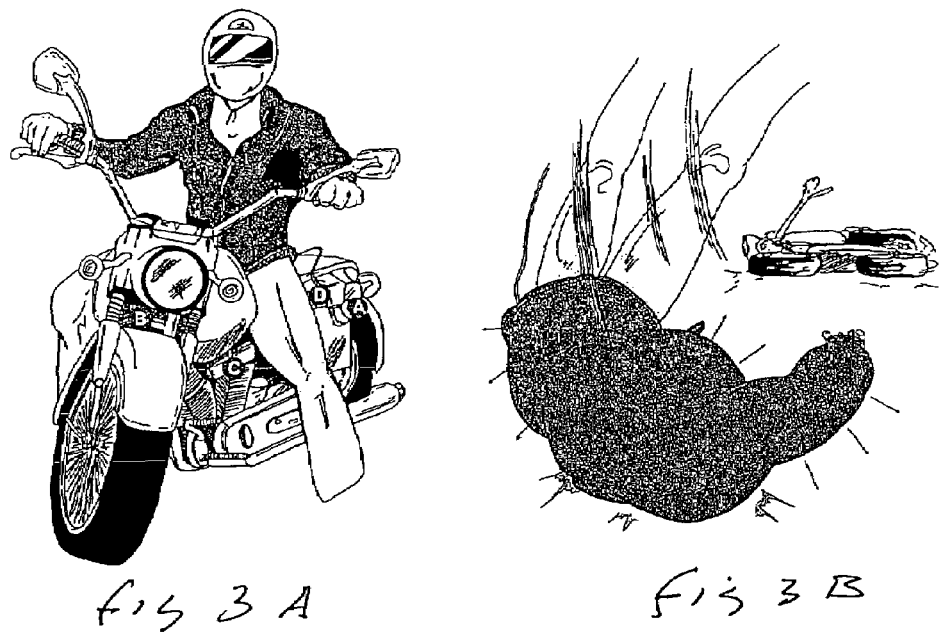
Figure 3.
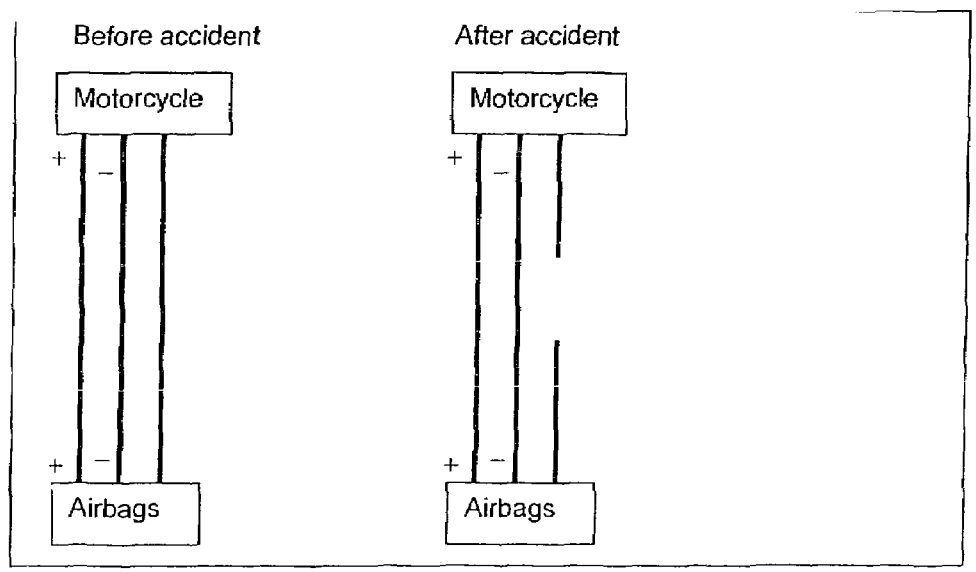
Figure 4. Connecting Rider module to airbags

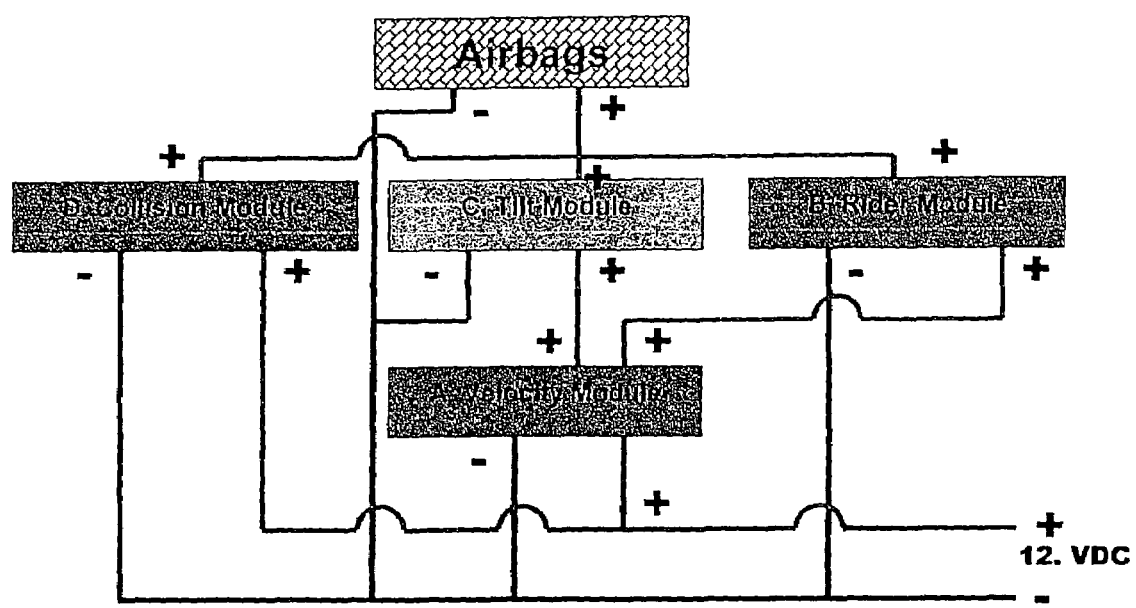
Figure 5. Conceptual circuit.

AIRBAG EQUIPPED GARMENT AND DEPLOYMENT SYSTEM

This application claims priority to Provisional Application No. 60/671,097 filed on Apr. 14, 2005.

FIELD OF THE INVENTION

This invention relates to an airbag equipped garment and deployment system and more particularly to a protective system for minimizing impact caused injuries to the body of a motorcycle rider involved in an accident.

BACKGROUND FOR THE INVENTION

The risk for injury to a motorcycle rider in the event of an accident is well known. In fact, a number of U.S. Patents have addressed this issue. For example, a U.S. Patent of Crane, U.S. Pat. No. 4,059,852 relates to an inflatable suit for cyclists. The suit comprises a body part enclosing covering means including an effectively hollow body-part-contoured inflatable bag provided with ingress port means and exterior inflating tube means communicating the ingress port means and pressurized gas supply means. Normally closed ingress valve means are provided for injecting pressurized gas into the inflatable bag in response to forced abrupt separation of a motorcyclist body from a motorcycle as a result of an accident. The rapid discharge of compressed gas into the inflatable bag brings about abrupt inflation thereof in a body-protecting manner. An inflating tube is provided with controllable manually engageable and disengageable coupling means for allowing selective mounting and dismounting of a motorcyclist without causing abrupt inflation of the inflatable bag.

A second U.S. Patent of Kincheloe, U.S. Pat. No. 4,825,469 discloses motorcycle safety apparel which may be made in stylish and unencumbered designs to encourage regular use by motorcycle riders. In the event of an impending or actual accident the apparel will inflate to provide a protective enclosure for the parts of the body most susceptible to critical or fatal injury. In the motorcycle application, the apparel is coupled to an umbilical cord to a container of compressed or liquefied gas with a much shorter pull cord being coupled between the rider and the valve of the container to rapidly inflate the apparel on separation of the rider from the motorcycle prior to separation of the umbilical cord. In one embodiment of the invention, the apparel is in the form of a jacket which includes a pleated hood like portion normally folded and resting under the jacket collar, and a pleated lower portion so that on inflation the hood will expand upward and then forward around the top and sides of the head and the lower portion will inflate and expand downward below the knees.

A more recent development in protection systems for motorcycle riders is disclosed in the U.S. Patent of Alaloof, U.S. Pat. No. 6,125,478. As disclosed therein, a protection system includes a garment shaped inflatable member for surrounding at least upper portions of the body of a rider of a motorcycle. Apparatus for exposing the interior of the inflatable member to a pressurized gas source for rapidly inflating the inflatable member in response to a sudden separation of the rider from the vehicle by at least a predetermined distance is also provided. The inflatable member has a garment-shaped configuration when in a non-inflated orientation. However, when inflated it has an expanded generally bulbous configuration such that large magnitude concentrated forces experienced on impact with an object subsequent to the sudden separation of the rider from the vehicle are prevented thereby protecting the surrounded upper portions of the rider's body from serious injury.

Notwithstanding the above, it is now believed that there may be a large market for an improved protective system for a motorcyclist in accordance with the present invention. There should be a market for such systems since they deploy gas into an inflatable suit in the event of a motorcyclist becoming separated from the motorcycle, or if the motorcycle tilt is sufficient to cause an accident. In addition, the system includes a sensor for sensing the speed of the motorcycle and activating the inflatable means only when the speed of the motorcycle exceeds a predetermined amount. Further, the system includes means for rapidly deploying gas into the inflatable garment in the event of a collision and irrespective of the speed of the motorcycle. Also, it is believed that such systems can be manufactured at a reasonable cost, are durable, and reliable. Further, the systems in accordance with the invention include a garment which is relatively unobtrusive prior to inflation so that they are more likely to be accepted by motorcycle riders.

BRIEF SUMMARY OF THE INVENTION

In essence, the present invention contemplates an airbag equipped garment and deployment system for minimizing impact caused injury to the body of a motorcycle rider. The system includes a garment shaped inflatable member for encompassing an upper body of a motorcycle rider, a source of gas and means for rapidly deploying said gas into said inflatable member. The system also includes first sensing means for sensing the separation of the motorcycle rider from the motorcycle and for rapidly deploying gas from the source of gas into the inflatable member. The system also includes second sensing means for sensing the tilt of a motorcycle from vertical and for rapidly deploying gas from the source of gas into the inflatable member when the tilt of the motorcycle exceeds a preselected angle as for example, when an accident is imminent. An important feature of the present invention resides in activating means for activating the first and second sensing means only when the speed of the motorcycle exceeds a predetermined speed. Further, the system includes means independent of the activating means for sensing a collision involving the motorcycle and for rapidly deploying gas into the member in response to the collision.

The invention will now be described in connection with the accompanying figures wherein like reference numerals have been used to identify like parts.

DESCRIPTION OF THE DRAWINGS

FIGS. 1A and 1B are front views illustrating a garment in accordance with the present invention and which show the garment in an uninflated and inflated condition;

FIG. 2 is a side view illustrating a garment in accordance with the present invention wherein the garment is shown in a normal riding condition and in an inflated condition;

FIGS. 3A and 3B is a schematic illustration showing a motorcyclist and the same motorcyclist as thrown from his motorcycle;

FIG. 4 is a schematic illustration illustrating the means for connecting a rider module to the airbags before and after an accident; and FIG. 5 is a schematic diagram of a system for deploying the airbags when a collision is sensed.

DESCRIPTION OF THE PREFERRED EMBODIMENTS OF THE INVENTION

Vehicular transportation has rapidly diversified and evolved. Cars and motorcycles have become an indispensable source of transportation for millions around the world. However, this evolution was not without its bad side; vehicular accidents due to excessive speed have caused irreparable damage for humans, ranging from deaths to costly disability.

As a result, development of vehicle safety has become an integral part of vehicular design. With the use of safety devices, bodily injury is dramatically reduced. Car manufacturers have gone to great lengths to improve onboard safety devices, constantly improving frames, panels, seat belts, airbags, and many other structural and electronic features of the car. Motorcycle riders do not benefit from such devices. Motorcycles' open design and nature of operation has made onboard safety devices unimplemented by motorcycle manufacturers. Rather, safety devices have been developed so that they cover different parts of the rider's body as opposed to being onboard the motorcycle itself. Yet, motorcycle riders remain more susceptible to accident related fatalities and injuries than car drivers and passengers.

This invention provides a new safety device to protect motorcycle's rider from severe bodily injury associated with accidents.

The invention contemplates special attire for motorcycle riders. This attire will provide protection to the motorcycle rider's body by utilizing the concept of airbags that is used in cars, although airbags will be designed and modified so that they will assume the required shape of the attire. This attire can be designed in three different trims:

1. Sleeveless vest. Compared to the other two trims, this trim will have the least level of protection. The sleeveless vest will offer protection to rib cage, spine, neck, abdomen, and hip area.
2. Full jacket (depicted in FIGS. 1 and 2). Offers protection to the same body areas as the sleeveless vest, but also adds protection to arms and shoulders.
3. Full attire. Offers the same level of protection as the full jacket, but also adds protection to the lower body.

All trims of the attire do not provide protection for the head, as the rider should be wearing a helmet.

The attire will feature an electronic system that is responsible for deploying airbags. The electronic system is comprised of four modules. Each module will feature a sensor that is fitted to the motorcycle. All signals connecting modules to the airbags will be transported via cables. The four modules are depicted in FIG. 5.

A. Velocity Module.

This is the primary module. It detects if the motorcycle has exceeded a preset velocity. Once this module detects a velocity greater than the preset value it sends a signal to enable two other modules (B and C).

B. Motorcycle Rider Module.

This module features a sensor that operates when the motorcycle rider is separated from the motorcycle at a velocity greater than the one preset by the velocity module (module A) Connecting this module to the airbags are 3 cables:

1. A cable that carries positive line from the motorcycle to the airbags.
2. A cable that carries negative signal from the motorcycle to the airbags.
3. A cable that detects separation of rider from a motorcycle. This cable is shorter than the previous two. When this cable is disconnected, separation of motorcycle rider from the motorcycle is sensed and this module deploys the attire's airbags. Refer to FIG. 4.

C. Tilt Module.

This module measures the tilt angle of the motorcycle. When the motorcycle experiences dangerous tilting (from either side, front, or back), this module deploys the attire's airbags.

D. Collision Module.

This module operates independently from the rest of the modules and is responsible for deploying the attire's airbags when a collision is sensed. Multiple collision modules can be fitted on the motorcycle.

While the invention has been described in connection with its preferred embodiments, it should be recognized that changes and modifications may be made therein without departing from the scope of the appended claims.

What is claimed is:

1. An airbag equipped garment and deployment system for minimizing impact caused injury to the body of a motorcycle rider consisting of:
   a garment shaped inflatable member for encompassing an upper body of a motorcycle rider;
   a source of gas and means for rapidly deploying said gas into said inflatable member;
   a rider sensing module including first sensing means for sensing the separation of a motorcycle rider from the motorcycle and for rapidly deploying gas from said gas source into said inflatable member;
   a tilt module including second sensing means for sensing the tilt of a motorcycle from vertical and for rapidly deploying gas from said source of gas into said inflatable member when the tilt of the motorcycle exceeds a predetermined angle;
   a velocity module including speed sensing means and activating means for activating said first and said second sensing means when the speed of the motorcycle exceeds a predetermined speed;
   a collision module including means independent of said activating means for sensing a collision involving the motorcycle and for rapidly deploying gas into said inflatable member in response to a collision; and
   electrical circuit means operatively connecting said rider sensing module, said tilt module, said velocity module and said collision module to said source of gas and said means for rapidly deploying said gas wherein said first sensing means and said second sensing means are activated when said speed sensing means detects a speed in excess of a predetermined speed or when said second sensing means detects a tilt of the motorcycle that exceeds the predetermined tilt and wherein said means for sensing a collision is activated independently of said speed sensing means.

2. An airbag equipped garment and deployment system for minimizing impact caused injury to the body of a motorcycle rider according to claim 1 in which said garment shaped inflatable member is a sleeveless vest to provide protection for the riders upper body.

3. An airbag equipped garment and deployment system for minimizing impact caused injury to the body of a motorcycle rider according to claim 1 in which said garment shaped inflatable member is a full jacket to provide protection to the upper body, arms and shoulder.

4. An airbag equipped garment and deployment system for minimizing impact caused injury to the body of a motorcycle rider according to claim 1 in which said garment shaped inflatable member adds protection for the lower body.

* * * * *